US007868872B2

(12) United States Patent
Tseng

(10) Patent No.: US 7,868,872 B2
(45) **Date of Patent: *Jan. 11, 2011**

(54) BUTTON STRUCTURE AND DESIGN METHOD FOR LATCHING PREVENTION

(75) Inventor: Jen-Shou Tseng, Miao-Li Hsien (TW)

(73) Assignee: Transpacific Systems, LLC, Wilmington, DE (US)

( * ) Notice: Subject to any disclaimer, the term of this patent is extended or adjusted under 35 U.S.C. 154(b) by 780 days.

This patent is subject to a terminal disclaimer.

(21) Appl. No.: 11/531,228

(22) Filed: Sep. 12, 2006

(65) Prior Publication Data

US 2007/0056838 A1 Mar. 15, 2007

Related U.S. Application Data

(63) Continuation of application No. 10/604,528, filed on Jul. 29, 2003, now Pat. No. 7,115,827.

(30) Foreign Application Priority Data

Aug. 13, 2002 (TW) .............................. 91118156 A

(51) Int. Cl.
*G06F 3/02* (2006.01)

(52) U.S. Cl. ...................................... 345/168; 200/341

(58) Field of Classification Search ....................... None
See application file for complete search history.

(56) References Cited

U.S. PATENT DOCUMENTS 3,911,233 A * 10/1975 Nakamura et al. .......... 200/5 R
4,700,377 A * 10/1987 Yasuda et al. ............ 379/88.16
5,172,805 A 12/1992 Gumb
5,231,386 A * 7/1993 Brandenburg et al. ........ 345/174
5,340,956 A * 8/1994 Chen .......................... 200/341
5,389,755 A 2/1995 Chen
5,536,911 A * 7/1996 Madill ........................ 200/6 A
5,710,397 A * 1/1998 Liao ........................... 200/5 A
5,817,997 A * 10/1998 Wernig ..................... 200/16 R
5,821,482 A 10/1998 Ootani et al.
5,957,272 A 9/1999 Kim
6,046,420 A * 4/2000 DeMoss ..................... 200/534
6,184,481 B1 2/2001 Chen
6,191,776 B1 * 2/2001 Hu ............................. 345/168

* cited by examiner

*Primary Examiner*—Alexander Eisen
*Assistant Examiner*—Matthew Yeung
(74) *Attorney, Agent, or Firm*—Stolowitz Ford Cowger LLP

(57) ABSTRACT

A latch-free button structure and its design method that can be applied to most electronic devices. The button includes a body, a wing plate, a positioning plate and a contact rod. The top end of the wing plate joins with the side edges of the button body and the positioning plate joins with the lower end of the wing plate. The contact rod is attached to the bottom section of the button body. If the height from the bottom of the contact rod to the contact point on the circuit board is B; the height from the bottom section of the button body to the surface of the housing is C; the height of the wing plate is A; the height of the sidewall of the button cover close to the button body is D and the height from the uppermost section of the button body to the top end of the wing plate is E, the value of A, B, C, D and E must follow the inequality relationships E−B>D, E−D>A, and D>A≧C≧B.

26 Claims, 2 Drawing Sheets

BUTTON STRUCTURE AND DESIGN METHOD FOR LATCHING PREVENTION

CROSS REFERENCE TO RELATED APPLICATIONS

This is a Continuation Patent Application of U.S. patent application Ser. No. 10/604,528, filed Jul. 29, 2003, now U.S. Pat. No. 7,115,827 which claims the benefit of foreign priority under 35 USC §119(a) to Taiwan application serial no. 911118156, filed Aug. 13, 2002.

BACKGROUND OF INVENTION

1. Field of Invention

The present invention relates to a button structure and design method. More particularly, the present invention relates to a button structure and design method for preventing the latching of buttons.

2. Description of Related Art

Keyboard provides an essential communication interface between users and their electronic products. As the need for electronic products continues to increase, different types of key button structures and design methods are also developed. If, for whatever reason, the button is momentarily latched when the button is pressed, smoothness of the keying operation is affected. Therefore, providing a latch-free button structure and design method is critical to the keyboard operation.

FIGS. 1A and 1B are schematic views showing the configuration of one of the buttons inside a conventional electronic product before and after the button is pressed. As shown in FIG. 1A, the electronic product 10 includes at least a housing 20, a plurality of buttons 30 (only one is shown) and a printed circuit board (PCB) 40. The button 30 comprises a cap body 32 and a contact rod 34 attached to the bottom section of the cap body 32. The circuit board 40 is placed inside the housing 20 and the button 30 is positioned between the housing 20 and the circuit board 40. The upper section of the cap body 32 is exposed to the top through the housing 20. Through the pressing action provided by a user, the contact rod 34 underneath the button 30 touches an electrical contact 42 on the circuit board 40 leading to electrical conduction.

As shown in FIG. 1B, dimensional tolerance of the buttons 30 in most electronic products 10 is generally loose. When a user presses on the cap body 32 of the button 30 so that the contact rod 34 touches the contact point 42 on the circuit board 40, the cap body 32 may deform momentarily and press against the sides of the housing 20. If point a of the cap body 32 is pushed below point c or point a is caught between point b and point c of the sidewall 22 of the housing (as shown in FIG. 1B), the cap body 32 is easily latched to the sidewall 22. As a result, the button 30 has difficulties returning to its original position after the pressure on the button 30 is released leading to a slowdown of typing.

SUMMARY OF INVENTION

Accordingly, one object of the present invention is to provide a button structure and design method capable of preventing the latching of buttons. By design, the button body, the housing, the button cover and the circuit board all have precise dimensional relationship with each other so that a button structure fabricated according to this dimensional relationship is latch-free.

To achieve these and other advantages and in accordance with the purpose of the invention, as embodied and broadly described herein, the invention provides a button structure and its design method for preventing latching. The button structure can be applied to many types of electronic products includes cellular phone, personal digital assistant (PDA), scanners and calculators. A button is positioned between a button cover and a housing directly above an electrical contact on a printed circuit board. The button includes a body, a wing plate, a positioning plate and a contact rod. The side edge of the button body and the top end of the wing plate are joined together. The positioning plate joins to the bottom end of the wing plate. The contact rod is attached to the bottom section of the button body. Assume height from the bottom of the contact rod to the contact point on the circuit board is B; height from the bottom section of the button body to the surface of the housing is C; height of the wing plate is A; height of the sidewall of the button cover close to the button body is D and height from the uppermost section of the button body to the top end of the wing plate is E. The dimensions A, B, C, D and E must follow the inequality relationships $E-B>D$, $E-D>A$ and $D>A\geqq C\geqq B$.

Thus, as long as various components of the button structure are fabricated according to the aforementioned design dimensions, the button is able to travel down and touch the contact point on the circuit board. In addition, the highest point on the side edges of the button body will not drop below the highest point on the sidewall of the button cover next to the button body. Hence, one direct cause of latching is eliminated so that the button may smoothly return to its original position once the pressure is released.

It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

Figure 1A:
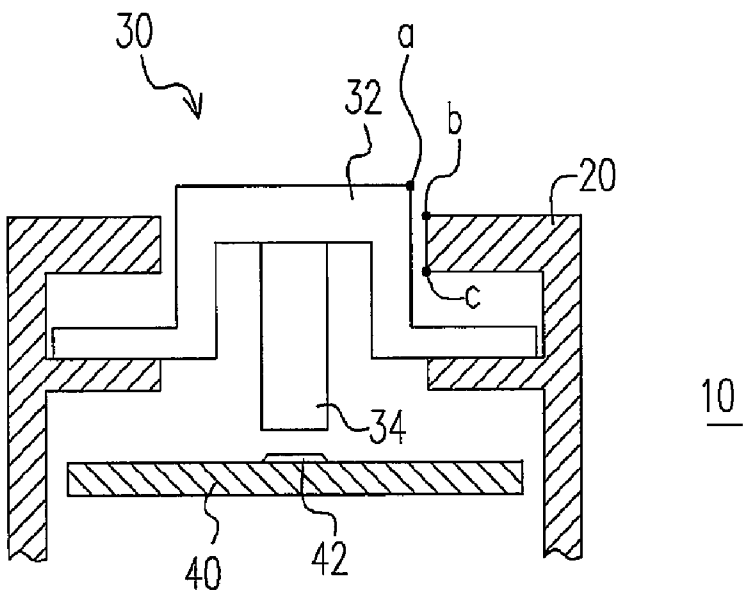
FIG. 1A(PRIOR ART)
FIGS. 1A and 1B are schematic views showing the configuration of one of the buttons inside a conventional electronic product before and after the button is pressed.
Figure 1B:
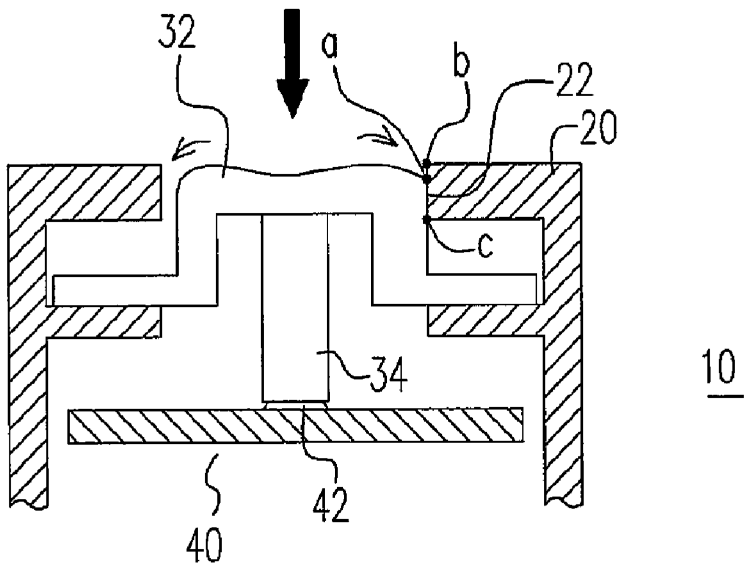
FIG. 1B(PRIOR ART)

Reference will now be made in detail to the present preferred embodiments of the invention, examples of which are illustrated in the accompanying drawings. Wherever possible, the same reference numbers are used in the drawings and the description to refer to the same or like parts.

Figure 2A:
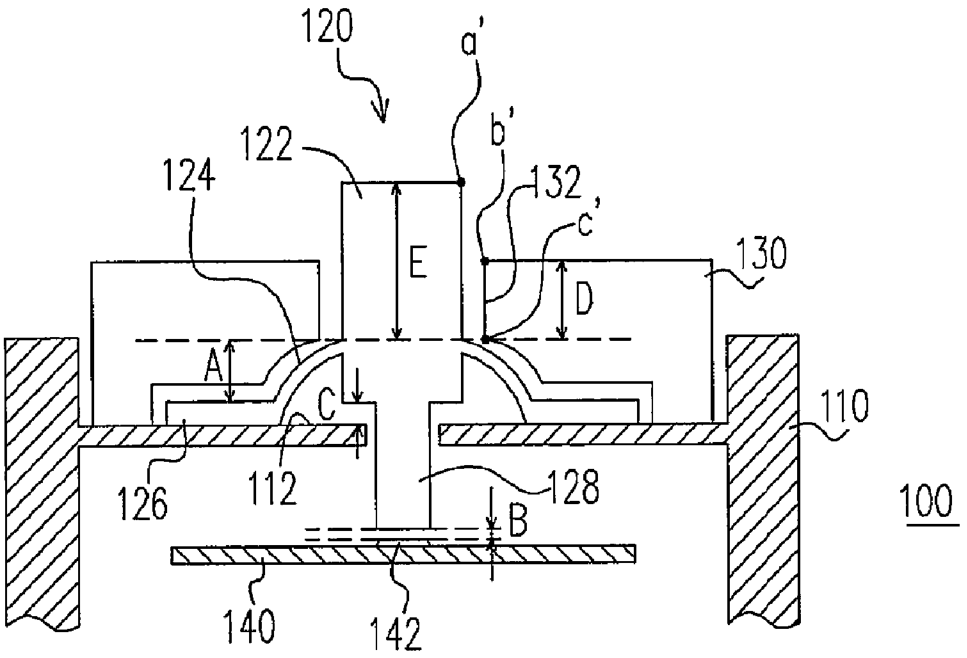
FIGS. 2A and 2B are schematic views showing the structure of a button and the configuration before and after the button is pressed according to one preferred embodiment of this invention.

FIG. 2A is a cross-sectional view of a button structure for an electronic product and the configuration before the button is pressed according to one preferred embodiment of this invention. As shown in FIG. 2A, the electronic product includes at least a housing 110, a plurality of buttons 120 (only one button is shown), a button cover 130 and a circuit board 140. The circuit board 140 is enclosed inside the housing 110 and the button 120 is positioned between the button cover 130 and the housing 110. The button 120 comprises a body 122, a wing plate 124, a positioning plate 126 and a contact rod 128. The wing plate 124 has an outward-arcing sectional profile. The side edges of the button body 122 and the upper end of the wing plate 124 are joined together. The positioning plate 126 lying flat on the outer surface of the housing 110 joins with the lower end of the wing plate 124. The contact rod 128 is attached to the bottom section of the button body 122. Various components constituting the aforementioned button 120 may be manufactured together as an integrated unit (as shown in FIG. 2A). Alternatively, the button body 122 and the contact rod 128 are individually manufactured and then assembled together therefore (as shown in FIG. 2B).

Assume height from the bottom of the contact rod 128 to the contact point 142 on the circuit board 140 is B; height from the bottom section of the button body 122 to the surface 112 of the housing 110 is C; height of the wing plate 124 is A; height of the sidewall 132 of the button cover 130 close to the button body 122 is D and height from the uppermost section of the button body 122 to the top end of the wing plate 124 is E. The dimensions A, B, C, D and E must follow the inequality relationships $E-B>D$, $E-D>A$ and $D>A\geqq C\geqq B$.

Figure 2B:
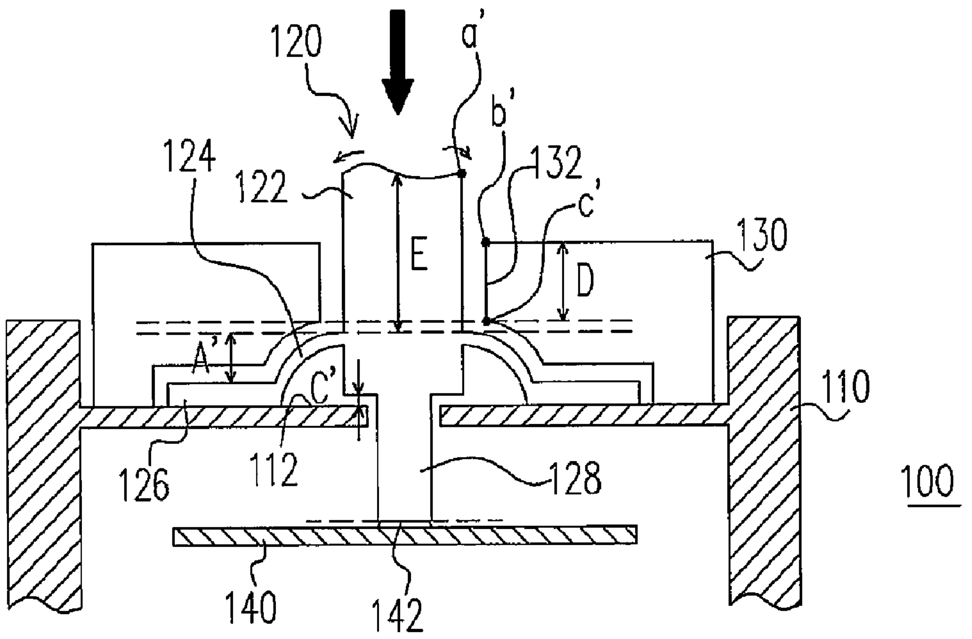

FIG. 2B is a cross-sectional view of a button structure for an electronic product and the configuration after the button is pressed according to one preferred embodiment of this invention. When a user presses the top of the button 120, the button body 122 and the contact rod 128 underneath travels downward until the contact rod 128 touches the contact point 142 on the circuit board 140 and conducts electricity. In the meantime, the wing plate 124 attached to the side edge of the button body 122 will deform while the button body 122 moves down.

When the user releases the pressure on the button 120, the button body 122 will return to its original position because the deformed wing plate 124 stores up some elastic energy.

As shown in FIGS. 2A and 2B, the button 120, the housing 10, the button cover 130 and the circuit board 140 all have some dimensional regulations (that is, $E-B>D$, $E-D>A$ and $D>A\geqq C\geqq B$). When the contact rod 128 is in contact with the contact point 142 on the circuit board 140, the downward distance moved by the bottom section of the contact rod 128 towards the contact point 142 is the height B. At this moment, the highest point a' at the side of the button body 122 also moves downward by the height B. Since it has a height limitation from the top of the button body 122 to the height E for the top of the wing plate 124 ($E-B>D$), when the point a' moves downward by the height B, the point a' will lower than the point b', resulting in the increase of probability to push the button. Therefore, the condition of $E-B>D$ is a necessary condition.

When the contact rod 128 is in contact with the contact point 142 on the circuit board 140 and moves downward by the height B, the bottom section of the button body 122 also moves downward by the height B at the same time. Since the distance from the bottom section of the button body 122 to the surface 112 of the housing 110 is the height C and $C\geqq B$, the distance from the bottom section of the button body 122 to the surface 112 of the housing 110 will reduce to C' ($C'=C-B$, when $C>B$) or zero (when $C=B$) when the contact rod 128 touches the contact point 142 on the circuit board 140. By a reverse argument from such a dimensional relationship, if the height $C<$ the height B, the contact rod 128 only has to travel a distance C before the bottom section of the button body 122 and the surface 112 of the housing 110 are in contact. Hence, the contact rod 128 is prevented from moving further down to contact the contact point 142 on the circuit board 140. Under such circumstances, electrical conduction by the contact rod 128 is prevented. Hence, the relationship: height of $C\geqq$ height of B is a first condition.

When the bottom section of the button body 122 moves down to the height C, the deformation in the wing plate 124 is also the height C. Since the height A of the wing plate 124 is grater or equal to the height C, that is, the height $A\geqq$ the height C, the height of the wing plate 124 is reduced to A' (where $A'=A-C$ when $A>C$) or zero (when $A=C$). By a reverse argument from such a dimensional relationship, if the height $A<$ the height C, the bottom section of the button body 122 only has to move downward by a distance C before the deformation of the wing plate 124 exceeds the height A of the wing plate 124. Thereafter, the wing plate 124 will start to cave in. Thus, the wing plate 124 is likely to stay deformed instead of returning to its former configuration leading to a higher probability of latching. Hence, the relationship: height of $A\geqq$ height of C is a second condition.

If the height of deformation of the downward moving wing plate 124 is A and the downward movement of point a' is also the height A and assume that the point a' at the top of the button body 122 has a height equal to the point b' on the sidewall 132 of the button cover 130, the point a' will not be lower than the point c' because the height $D>$ the height A. By a reverse argument, if the height $D<$ the height A, as the point a' moves downward along with the wing plate 124 a distance equal to the height A, the distance a' traveled will exceed the height D of the sidewall 132 and stay below the point c'. As this will increase latching probability, the relationship: height of $D>$ height of A is a third condition.

If the point a' at the top of the button body 122 moves down a distance equal to the height A along with the wing plate 124, the point a' will not drop below the point b' because the height E (from the top of the button body 122 to the top end of the wing plate 124) is regulated by the relationship $E-D>A$. By a reverse argument, if $E-D>A$ holds, as soon as the point a' moves down by a distance equal to the height A along with the wing plate 124, the point a' has dropped below the point b'. As this will increase latching probability, the relationship: the height $E-D>$ the height of A is a fourth condition.

In conclusion, this invention provides a means of reducing the latching of buttons as long as various components constituting the button structure adheres to the aforementioned dimensional relationships (that is, $E-B>D$, $E-D>A$ and $D>A\geqq C\geqq B$). When the button fabricated according to this invention is pressed, the highest point on the side edge of the button body will not drop below the highest point on the sidewall of the button cover next to the button body. In other words, latching of the buttons is prevented and hence any electronic product having the button structure can operate smoothly.

Basically, the foregoing parameters A, B, C, D, E are set to have the relation of $E-B>D$. Further still, the additional condition can be added by $E-D>A$, $D>A$, $A\geqq C$, $A\geqq B$, or $C\geqq B$.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

The invention claimed is:

1. A keyboard, comprising: a plurality of contact points; a button housing located above an associated one of the contact points; a button body having side edges, a first section, a second section opposite the first section, and at least one wing plate, wherein the at least one wing plate includes a first end and a second end, and wherein the first end is coupled to one of the side edges of the button body at a junction, and forms an arc downward from the junction;

a positioning plate coupled to the second end of the at least one wing plate and disposed on the button housing; and a contact rod coupled to the second section of the button body, wherein the contact rod is suspended above the associated one of the contact points by the at least one wing plate, and the second section of the button body is configured to contact the button housing to restrict deformation of the at least one wing plate toward the associated one of the contact points;

wherein a distance between the contact rod and the associated one of the contact points is B, a distance between the second section of the button body and the button housing is C, a height of the at least one wing plate is A, a height of a sidewall of a button cover next to the button body is D, a height from a top end of the button body to the first end of the at least one wing plate is E, and E−B>D.

2. The keyboard of claim 1, wherein the positioning plate is disposed on a top side of the button housing and extends lengthwise out from the second end of the at least one wing plate.

3. The keyboard of claim 1, wherein A≧C.

4. The keyboard of claim 1, wherein A≧B.

5. The keyboard of claim 1, wherein C≧B.

6. The keyboard of claim 1, wherein the button body, the at least one wing plate, the positioning plate, and the contact rod comprise an integrated unit.

7. The keyboard of claim 1, wherein the at least one wing plate comprises an elastic material configured to partially deform toward the associated one of the contact points until the button body contacts the button housing.

8. An apparatus, comprising:

a button housing and a contact point, wherein the button housing is positioned above the contact point and has a slot formed therethrough;

a button body, comprising a first section configured to receive pressure, a second section opposite the first section, and at least one wing plate, wherein the at least one wing plate includes a first end and a second end opposite the first end, and wherein the first end is coupled to a side of the button body to form a junction and is configured to arc downward from the junction;

a positioning plate coupled to the second end of the at least one wing plate and extending out away from the slot along a top side of the button housing; and a contact rod coupled to the second section of the button body;

wherein a distance between the contact rod and the contact point is B, a distance between the second section of the button body and the top side of the button housing is C, a height of the at least one wing plate is A, a height of a sidewall of a button cover next to the button body is D, a height from a top end of the button body to the first end of the wing plate is E, and wherein E−B>D.

9. The apparatus of claim 8, wherein the contact rod is suspended in the slot and above the contact point by the at least one wing plate, and the second section of the button body is configured to contact the top side of the button housing to restrict downward deformation of the at least one wing plate toward the contact point.

10. The apparatus of claim 8, wherein the button housing is located on a scanner.

11. The apparatus of claim 8, wherein E−D>A.

12. The apparatus of claim 8, wherein D>A.

13. The apparatus of claim 8, wherein A≧C.

14. The apparatus of claim 8, wherein A≧B.

15. The apparatus of claim 8, wherein C≧B.

16. The apparatus of claim 8, wherein the button body, the at least one wing plate, the positioning plate, and the contact rod comprise an integrated unit.

17. The apparatus of claim 8, wherein the at least one wing plate comprises elastic material.

18. The apparatus of claim 8, wherein the contact point is coupled to a circuit board.

19. A device, comprising:

a button housing extending above a contact point and having an opening formed therethrough;

a button comprising an upper section and a lower section;

a contact rod extending down from the lower section of the button; and a wing plate comprising a top end coupled to the button and a bottom end suspended by the button housing above the contact point, wherein the wing plate holds the contact rod in the opening and above the contact point and the lower section of the button is configured to contact the button housing to restrict deformation of the wing plate toward the contact point;

wherein a distance between the contact rod and the contact point is B, a distance between the lower section of the button and an upper surface of the button housing is C, a height of the wing plate is A, a height of a sidewall of a button cover next to the button from the top end of the wing plate to a top end of the button cover is D, a height from a top end of the button to the top end of the wing plate is E, and E−B>D.

20. The device according to claim 19 further comprising a button cover having an inner sidewall that extends adjacent to an outermost side of the upper section of the button and extends adjacent to substantially an entire outside surface of the wing plate.

21. An apparatus, comprising: actuator means having an upper portion configured to receive an actuator force and a lower portion extending down from the upper portion;

contact means extending down from the lower portion of the actuator means; suspension means flexibly connected to opposite sides of the actuator means between the upper portion and the lower portion; and housing means configured to hold a bottom end of the suspension means above a contact, wherein the actuator means is configured to contact the housing means and restrict deformation of the suspension means toward the contact point;

wherein a distance between the contact means and the contact is B, a distance between the lower section of the actuator means and an upper surface of the housing means is C, a height of the suspension means is A, a height of a sidewall of a cover means next to the actuator means from a top end of the suspension means to a top end of the cover means is D, a height from a top end of the actuator means to the top end of the suspension means is E, and E−B>D.

22. The apparatus according to claim 21 wherein the cover means is configured to extend at least partially along opposite sides of the actuator means and extend over the suspension means.

23. The apparatus according to claim 21 wherein the suspension means comprises an arched shape configured not to collapse when the bottom end of the contact means contacts the contact.

24. An apparatus, comprising:

a contact surface;

a housing positioned above the contact surface and having a slot formed therethrough;

a button body;

an arched shaped wing plate comprising a first end coupled to a side of the button body and a second end disposed on the housing; and a contact rod coupled to a bottom end of the button body and extending through the slot, wherein the contact rod is suspended above the contact surface by the arched shaped wing plate and the button body is configured to contact a top side of the housing to prevent the arched shaped wing plate from deforming toward the contact surface;

wherein a distance between the contact rod and the contact surface is B, a distance between the lower section of the button body and an upper surface of the button body is C, a height of the arched shaped wing plate is A, a height of a sidewall of a button cover next to the button body from the top end of the arched shaped wing plate to a top end of the button cover is D, a height from a top end of the button body to the top end of the arched shaped wing plate is E, and E−B>D.

25. The device according to claim 24 further comprising a positioning plate coupled to the second end of the arched shaped wing plate, the positioning plate extending out away from the slot along the top side of the housing.

26. The device according to claim 24 wherein the arched shaped wing plate comprises an elastic material configured to partially deform toward the contact surface until the button body contacts the top side of the housing.

* * * * *

UNITED STATES PATENT AND TRADEMARK OFFICE
CERTIFICATE OF CORRECTION

PATENT NO. : 7,868,872 B2
APPLICATION NO. : 11/531228
DATED : January 11, 2011
INVENTOR(S) : Tseng It is certified that error appears in the above-identified patent and that said Letters Patent is hereby corrected as shown below:

Column 1, lines 10-11, delete “serial no. 911118156,” and insert -- serial no. 91118156, --.

Signed and Sealed this
Twenty-fourth Day of May, 2011

David J. Kappos
*Director of the United States Patent and Trademark Office*